United States Patent
Wu et al.

(10) Patent No.: US 11,042,207 B2
(45) Date of Patent: Jun. 22, 2021

(54) POWER SAVING METHOD AND DISPLAY CONTROLLER CAPABLE OF OPTIMIZING POWER UTILIZATION

(71) Applicant: QISDA CORPORATION, Taoyuan (TW)

(72) Inventors: Kao-Yang Wu, Taoyuan (TW); Chia-Hsiung Kuo, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 151 days.

(21) Appl. No.: 16/403,630

(22) Filed: May 6, 2019

(65) Prior Publication Data

US 2019/0391633 A1 Dec. 26, 2019

(30) Foreign Application Priority Data

Jun. 26, 2018 (CN) .......................... 201810671078.4

(51) Int. Cl.
*G06F 1/32* (2019.01)
*G06F 1/3234* (2019.01)
*G06F 1/28* (2006.01)

(52) U.S. Cl.
CPC .............. *G06F 1/3265* (2013.01); *G06F 1/28* (2013.01)

(58) Field of Classification Search
CPC ........ G06F 1/3218; G06F 1/3265; G06F 1/28; Y02D 10/00; G09G 5/00; G09G 2330/021
See application file for complete search history.

(56) References Cited

U.S. PATENT DOCUMENTS

| | | | |
|---|---|---|---|
| 2009/0237384 A1* | 9/2009 | Hu | G09G 5/003 345/211 |
| 2011/0264828 A1* | 10/2011 | Zeung | G06F 1/1632 710/16 |
| 2016/0282922 A1* | 9/2016 | Petrovic | G06F 1/3296 |
| 2016/0294577 A1* | 10/2016 | Petrovic | H04L 43/0811 |
| 2018/0210526 A1* | 7/2018 | Lee | G06F 1/263 |

FOREIGN PATENT DOCUMENTS

| | | |
|---|---|---|
| CN | 102394052 A | 3/2012 |
| CN | 102957886 A | 3/2013 |
| TW | 201035742 A1 | 10/2010 |
| TW | 201416834 A | 5/2014 |
| TW | 201428472 A | 7/2014 |

* cited by examiner

*Primary Examiner* — Santosh R Poudel

(57) ABSTRACT

A power saving method includes enabling an input signal detection unit of the display controller for detecting a first presence of at least one input signal of the display controller, entering the display controller to a power-off mode temporarily for decreasing an operation power from a first power to a second power within a second time period when the at least one input signal is not received by the input signal detection unit within a first time period, detecting a second presence of the at least one input signal continuously by the input signal detection unit after the second time period elapses, and adjusting an operation mode of the display controller according to the second presence of the at least one input signal. The second power is smaller than the first power. The second power corresponds to a power of the display controller under the power-off mode.

12 Claims, 4 Drawing Sheets

POWER SAVING METHOD AND DISPLAY CONTROLLER CAPABLE OF OPTIMIZING POWER UTILIZATION

BACKGROUND OF THE INVENTION

1. Field of the Invention

The present invention illustrates a power saving method and a display controller, and more particularly, a power saving method and a display controller capable of optimizing power utilization in a standby mode.

2. Description of the Prior Art

With advancement of technologies and awakening of environmental consciousness, many environmental protection agencies have already developed various standards to reduce power consumption. Energy conservation and carbon reduction are common goals of the environmental protection agencies. Further, in recent years, since energy utilization becomes an important issue, the standards for power reduction in displays become more and more strict. Generally, the displays can be operated in three modes, such as a turn-on mode, a turn-off mode, and a standby mode. When a display is operated under in turn-on mode, since a power switch is turned-on, all functionalities can be enabled, leading to higher power consumption. When the display is operated in turn-off mode, since the power switch is turned-off, all functionalities are disabled, leading to lower power consumption. When the display is operated in standby mode, it only needs to maintain a function of detecting a presence of an input signal of a source, thereby leading to moderate power consumption.

Although conventional displays can operate in standby mode corresponding to the moderate power consumption, the power utilization is not optimized under the standby mode. As a result, since the standards for power reduction in the displays become strict, the conventional displays are required to modify or enhance their hardware circuits. For example, a display controller with a low power consumption or low power requirement in standby mode is introduced to the conventional display. In other words, when the power consumption of the display controller of the display cannot be reduced, the display cannot satisfy the standards for power reduction. Therefore, the display is only available for use in areas without strict laws, rules, or standards for power reduction. In other words, the displays can only be sold in markets with relaxed power consumption regulations.

SUMMARY OF THE INVENTION

In an embodiment of the present invention, a power saving method for a display controller is disclosed. The power saving method includes enabling an input signal detection unit of the display controller for detecting a first presence of at least one input signal of the display controller, entering the display controller to a power-off mode temporarily for decreasing an operation power of the display controller from a first power to a second power within a second time period when the at least one input signal is not received by the input signal detection unit within a first time period, detecting a second presence of the at least one input signal continuously by the input signal detection unit after the second time period elapses, and adjusting an operation mode of the display controller according to the second presence of the at least one input signal. The second power is smaller than the first power. The second power corresponds to a power of the display controller under the power-off mode.

In another embodiment of the present invention, a display controller is disclosed. The display controller includes a power control unit, a first switch, an input signal detection unit and a processor. The power control unit is configured to provide a plurality of driving voltages. The first switch comprises a first terminal coupled to the power control unit, a control terminal, and a second terminal. The input signal detection unit is coupled to the second terminal of the first switch. The processor is coupled to the power control unit, the input signal detection unit, and the control terminal of the first switch and configured to control the power control unit, the input signal detection unit, and the first switch. The processor enables the input signal detection unit and turns on the first switch for driving the input signal detection unit by a driving voltage. The input signal detection unit detects a first presence of at least one input signal of the display controller. The processor turns off the first switch for entering the display controller to a power-off mode temporarily so that an operation power of the display controller is decreased from a first power to a second power within a second time period when the at least one input signal is not received by the input signal detection unit within a first time period. The second power corresponds to a power of the display controller under the power-off mode. The processor turns on the first switch again for detecting a second presence of the at least one input signal continuously by the input signal detection unit after the second time period elapses. The processor adjusts an operation mode of the display controller according to the second presence of the at least one input signal. The second power is smaller than the first power.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
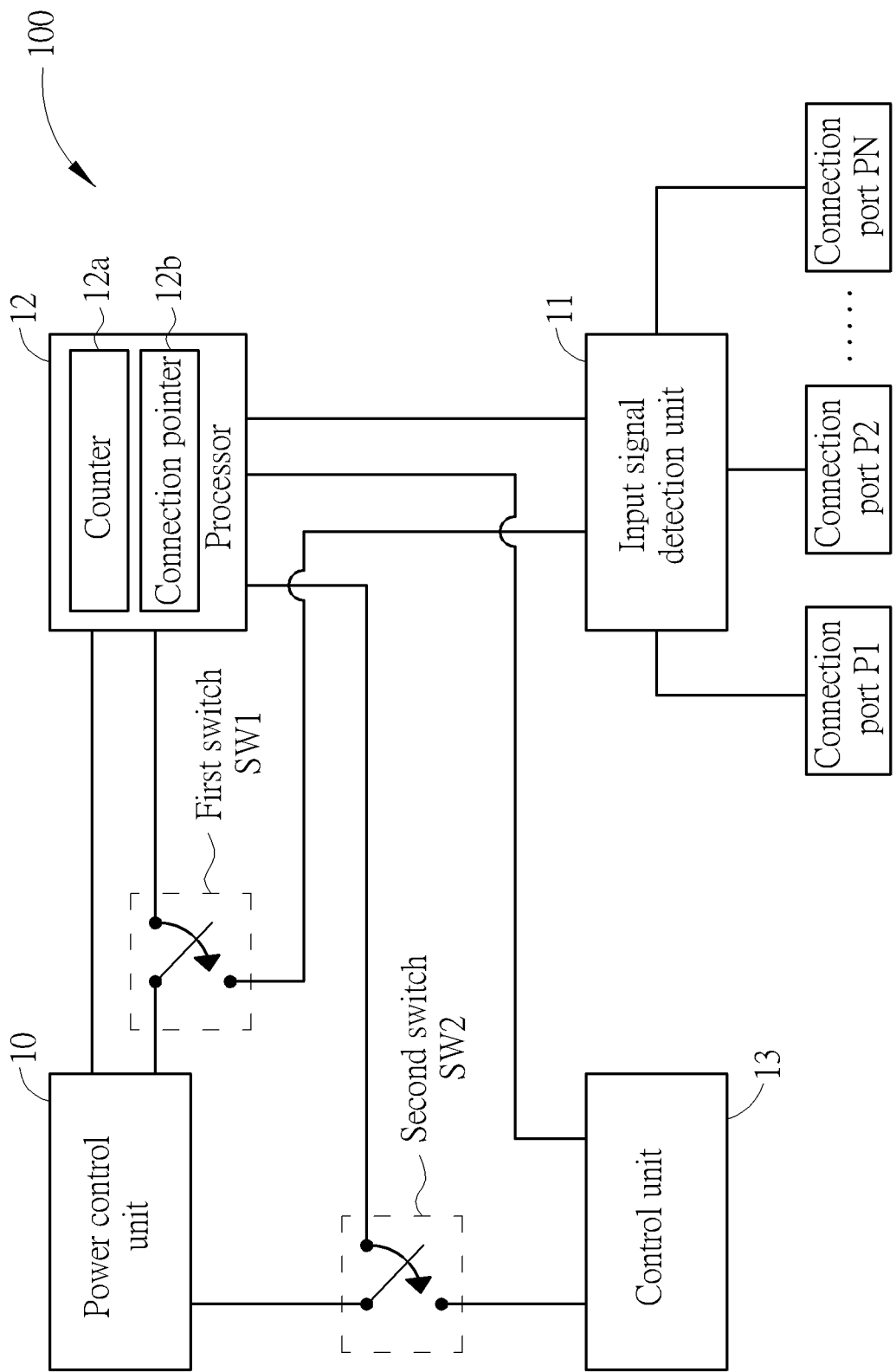
FIG. 1 is a block diagram of a display controller according to an embodiment of the present invention.

FIG. 1 is a block diagram of a display controller 100 according to an embodiment of the present invention. The display controller 100 can be a Scaler IC (Integrated Circuit) controller inside a display. Circuit components of the display controller 100 can be embedded into a chip. The display controller 100 includes a power control unit 10, a first switch SW1, an input signal detection unit 11, and a processor 12. The power control unit 10 is used for providing a plurality of driving voltages to drive a part of or all circuit components of the display controller 100. The first switch SW1 includes a first terminal coupled to the power control unit 10, a control terminal, and a second terminal. The first switch SW1 can be any type of switch, such as a transistor switch.

The input signal detection unit 11 is coupled to the second terminal of the first switch SW1. The processor 12 is coupled to the power control unit 10, the input signal detection unit 11, and the control terminal of the first switch SW1 for controlling the power control unit 10, the input signal detection unit 11, and the first switch SW1. The processor 12 can be any signal processing unit, such as a programmable logical unit or a micro-processor. The processor 12 can perform a counter function and a connection pointer function. The processor 12 can also be embedded in a counter circuit or a connection pointer circuit. Details of the processor 12 are illustrated later. The display controller 100 can further include a control unit 13 and at least one connection port P1 to PN. N is a positive integer. The control unit 13 is coupled to the processor 12 and coupled to the power control unit 10 through a second switch SW2 for setting at least one display parameter of the display controller 100. For example, the control unit 13 can be an input/output (I/O) unit, a memory switching unit, or an OSD (On-Screen Display) function based control device. The at least one connection port P1 to PN can be any type of connection port coupled to the input signal detection unit 11. For example, the connection port P1 can be used for receiving VGA (Video Graphics Array) data. The connection port P2 can be used for receiving HDMI (High Definition Multimedia Interface) data. The connection port P3 can be used for receiving DP (Display Port) data. When N is equal to one, it implies that a single connection port (P1) is introduced to the display controller 100. Therefore, the display controller 100 only supports to process video data with a single signal format. When N is greater than one, it implies that a plurality of connection ports (P1 to PN, N>1) are introduced to the display controller 100. Therefore, the display controller 100 can support to process video data with various signal formats. Further, a circuit structure of the display controller 100 is not limited to a circuit structure shown in FIG. 1. For example, additional circuit components can be introduced to the display controller 100 for enhancing its functionalities. The display controller 100 can also be integrated into a display device. Any reasonable hardware modification of the display controller 100 falls into the scope of the present invention.

In the display controller 100, the processor 12 can enable the input signal detection unit 11 and turn on the first switch SW1 for driving the input signal detection unit 11 by a driving voltage. Then, the input signal detection unit 11 can detect a first presence of at least one input signal of the display controller 100. In practice, the input signal detection unit 11 can be driven by the driving voltage provided from the power control unit 10. The power control unit 10 can provide various driving voltages such as a system voltage (or say, Vcc) and a ground voltage (or say, $V_{GND}$). The processor 12 can turn off the first switch SW1 for decreasing an operation power of the display controller 100 from a first power to a second power within a second time period when the at least one input signal is not received by the input signal detection unit 11 within a first time period. Further, the processor 12 can turn on the first switch SW1 again for detecting a second presence of the at least one input signal continuously by the input signal detection unit 11 after the second time period elapses. The processor 12 can adjust an operation mode of the display controller 100 according to the second presence of the at least one input signal. Here, the second power is smaller than the first power. In other words, the processor 12 can temporarily turn off a power of the input signal detection unit 11 (i.e., turn off the first switch SW1) for saving power. However, the processor 12 can temporarily turn off a power of the control unit 13 (i.e., turn off the second switch SW2) for saving power. The processor 12 can temporarily turn off the input signal detection unit 11 and the power of the control unit 13 by turning off the first switch SW1 and the second switch SW2 simultaneously for saving power. Any reasonable method of turning off at least one circuit component of the display controller 100 for saving power falls into the scope of the present invention. A power saving method performed by the display controller 100 is illustrated below.

Figure 2:
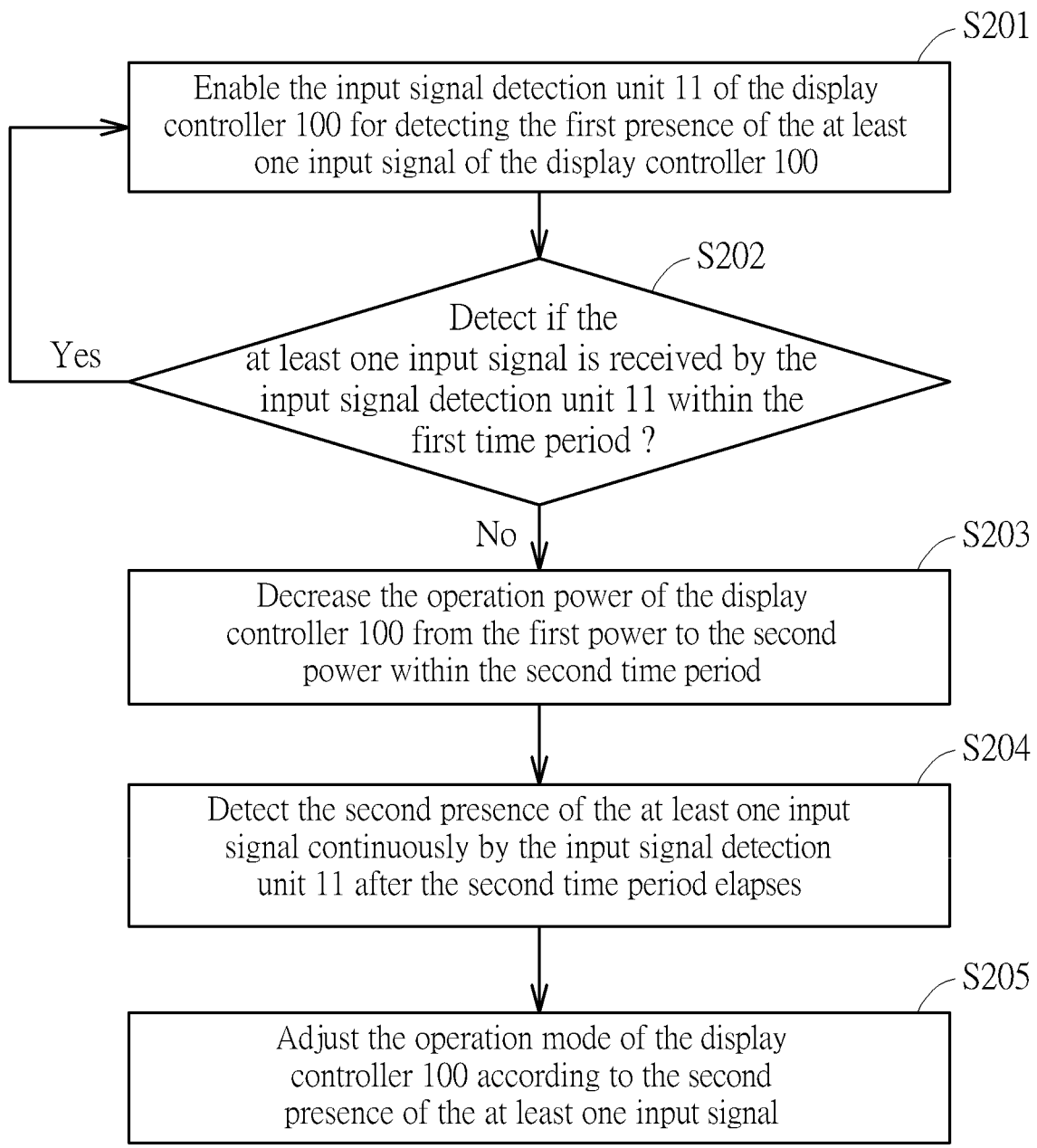
FIG. 2 is a flow chart of performing a power saving method by the display controller in FIG. 1.
Figure 3:
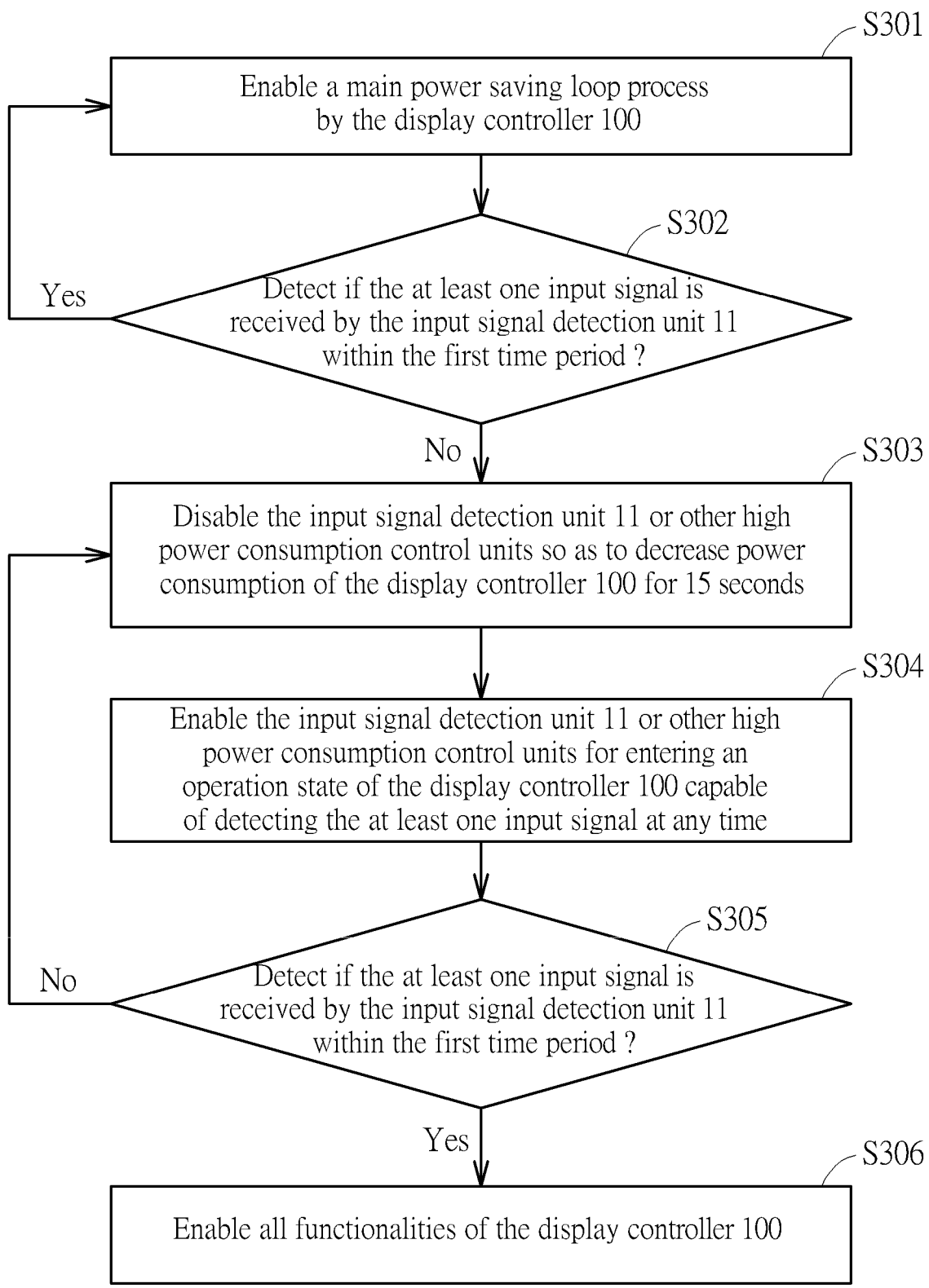
FIG. 3 is a flow chart of performing a power saving method for a single connection port by the display controller in FIG. 1.
Figure 4:
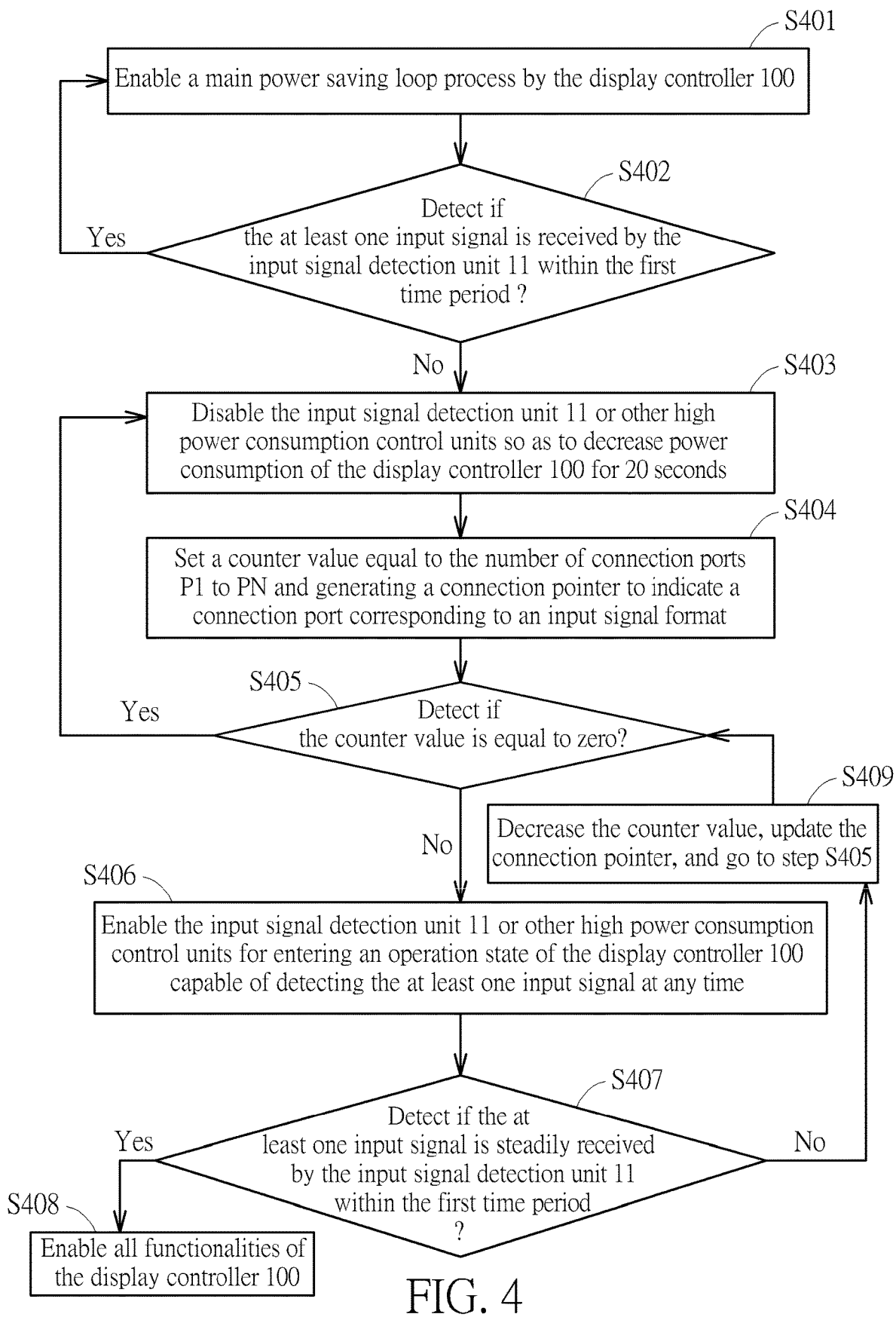
FIG. 4 is a flow chart of performing a power saving method for a plurality of connection ports by the display controller in FIG. 1.

FIG. 2 is a flow chart of performing the power saving method by the display controller 100. The flow chart of performing the power saving method by the display controller 100 in FIG. 2 is a generalized flow chart. FIG. 3 and FIG. 4 are two flow charts of the power saving method performed by different hardware circuits or different software packages of the display controller 100. However, in order to facilitate a person having ordinary skill in the art to easily understand the power saving method of the display controller 100, the generalized flow chart in FIG. 2 is illustrated first. Then, implementation details of steps are illustrated in FIG. 3 and FIG. 4. In FIG. 2, the power saving method performed by the display controller 100 includes step S201 to step S205, as written below.

step S201: enable the input signal detection unit 11 of the display controller 100 for detecting the first presence of the at least one input signal of the display controller 100;
step S202: detect if the at least one input signal is received by the input signal detection unit 11 within the first time period, if yes, go to step S201, else, go to step S203;
step S203: decrease the operation power of the display controller 100 from the first power to the second power within the second time period;
step S204: detect the second presence of the at least one input signal continuously by the input signal detection unit 11 after the second time period elapses;
step S205: adjust the operation mode of the display controller 100 according to the second presence of the at least one input signal.

In step S201, the display controller 100 can enable the input signal detection unit 11 for detecting the first presence of the at least one input signal of the display controller 100. For example, the processor 12 of the display controller 100 can turn on the first switch SW1 for driving the input signal detection unit 11 by the driving voltage provided from the power control unit 10. After the input signal detection unit 11 is enabled, the input signal detection unit 11 can detect the presence of the at least one input signal of at least one connection ports P1 to PN. In step S202, the input signal detection unit 11 can detect if the at least one input signal is received within the first time period. For example, the input signal detection unit 11 can detect if the at least one input signal is received by a connection port P1 within a period of two image frames. Also, the input signal detection unit 11 can detect if a frequency and a voltage of the at least one input signal of the connection port P1 is stable. Any reasonable technology modification falls into the scope of the present invention. When the at least one input signal is steadily received by the input signal detection unit 11, it implies that the display controller 100 is operated under a normal state. Video data can be processed normally. Therefore, the display controller 100 can perform step S201 again for continuously detecting the presence of the at least one input signal. When at least one input signal is unstable or is not received by the input signal detection unit 11, it implies that the display controller 100 cannot process the video data normally. Therefore, the display controller 100 can perform step S203. In step S203, the operation power of the display controller 100 can be decreased from the first power to the second power within the second time period. For example, when the at least one input signal is unstable or is not received by the connection port P1 within the period of the two image frames, the processor 12 can turn off the first switch SW1. After the processor 12 turns off the first switch SW1, the input signal detection unit 11 is disabled. Therefore, the operation power of the display controller 100 can be decreased from the first power (high) to the second power (low) within the second time period. However, the display controller 100 can use any method for decreasing the operation power. For example, the processor 12 can turn off the first switch SW1 and the second switch SW2 simultaneously for disabling the input signal detection unit 11 and the control unit 13 at the same time. Also, the processor 12 can only turn off the second switch SW2 for disabling the control unit 13. Also, the display controller 100 can temporarily enter a power-off mode. In step S204, the input signal detection unit 11 can detect the second presence of the at least one input signal continuously after the second time period elapses. For example, after the second time period elapses, the processor 12 can turn on the first switch SW1 again for enabling the input signal detection unit 11 again by the driving voltage provided from the power control unit 10. Then, the input signal detection unit 11 can detect the second presence of the at least one input signal continuously. In step S205, the processor 12 can adjust the operation mode of the display controller 100 according to the second presence of the at least one input signal. For example, the display controller 100 can enter the power-off mode or a power saving mode (i.e., disabling a part of circuit components) again when no input signal is detected. In the display controller 100, the input signal detection unit 11 can detect a first stability of the at least one input signal after the input signal detection unit is enabled. The input signal detection unit 11 can detect a second stability of the at least one input signal by the input signal detection unit after the second time period elapses. Therefore, in other embodiments, the display controller 100 can adjust the operation mode according to the presence and the stability of the at least one input signal. As previously mentioned, the display controller 100 can be designed to include a single connection port P1 or a plurality of connection ports P1 to PN. Therefore, steps of the power saving method performed by the display controller 100 can be modified according to hardware design of the display controller 100. Details are illustrated later.

FIG. 3 is a flow chart of performing a power saving method for the single connection port P1 by the display controller 100. The power saving method for the single connection port P1 performed by the display controller 100 includes step S301 to step S306. Any reasonable technology modification falls into the scope of the present invention. Step S301 to step S306 are written below.

step S301: enable a main power saving loop process by the display controller 100;

step S302: detect if the at least one input signal is received by the input signal detection unit 11 within the first time period, if yes, go to step S301, else, go to step S303;

step S303: disable the input signal detection unit 11 or other high power consumption control units so as to decrease power consumption of the display controller 100 for 15 seconds;

step S304: enable the input signal detection unit 11 or other high power consumption control units for entering an operation state of the display controller 100 capable of detecting the at least one input signal at any time;

step S305: detect if the at least one input signal is received by the input signal detection unit 11 within the first time period, if yes, go to step S306, else, go to step S303;

step S306: enable all functionalities of the display controller 100.

In step S301, the display controller 100 can enable the main power saving loop process. For example, the display controller 100 can enable the input signal detection unit 11 for periodically detecting if the control unit 13 (i.e., I/O key) is triggered. The display controller 100 is prepared to detect a presence and/or stability of the at least one input signal.

In step S302, the input signal detection unit 11 can detect if the at least one input signal is received within the first time period. For example, the input signal detection unit 11 can detect if the at least one input signal is received by the connection port P1 within a period of two image frames. Also, the input signal detection unit 11 can detect if the frequency and the voltage of the at least one input signal of the connection port P1 are stable. When the at least one input signal is unstable or is not received by the input signal detection unit 11 through the connection port P1 within the first time period, according to step S303, the processor 12 can disable the input signal detection unit 11 or other high power consumption control units (such as the control unit 13) so as to decrease power consumption of the display controller 100 for the second time period with 15 seconds length. In other words, the display controller 100 enters the power saving mode for 15 seconds. When the at least one input signal is received steadily by the input signal detection unit 11 through the connection port P1 within the first time period, the display controller 100 can perform step S301 for continuously detecting the at least one input signal. However, the display controller 100 is not limited to performing the power saving mode for 15 seconds. For example, the display controller 100 can enter the power-off mode or a power saving mode for any time length. Any reasonable method and technology modification for power saving fall into the scope of the present invention.

After the display controller 100 enters the power saving mode for 15 seconds in step S303, the processor can enable the input signal detection unit 11 or other high power consumption control units (such as the control unit 13) for entering the operation state of the display controller 100 capable of detecting the at least one input signal at any time according to step S304.

Since the input signal detection unit 11 is enabled again, according to step S305, the input signal detection unit 11 can detect if the at least one input signal is received within the first time period. For example, the input signal detection unit 11 can detect if the at least one input signal is received by the connection port P1 within the period of two image frames. Also, the input signal detection unit 11 can detect if the frequency and the voltage of the at least one input signal of the connection port P1 are stable again. When the at least one input signal is unstable or is not received by the input signal detection unit 11 through the connection port P1 within the first time period, the display controller 100 can perform step S303 to disable the input signal detection unit 11 or other high power consumption control units (such as the control unit 13) so as to decrease power consumption of the display controller 100 for the second time period with 15 seconds length. When the at least one input signal is received steadily by the input signal detection unit 11 through the connection port P1 within the first time period, the display controller 100 can perform step S306 for enabling all functionalities.

In step S301 to step S306, for the display controller 100 with the single port P1, when the at least one input signal is unstable or is not received by the input signal detection unit 11, the display controller 100 can periodically enable and disable the input signal detection unit 11 or other high power consumption control units, such as the control unit 13. Therefore, since the input signal detection unit 11 or other high power consumption control units can be periodically enabled and disabled, average power consumption of the display controller 100 can be reduced. Therefore, power utilization of the display controller 100 can be optimized.

FIG. 4 is a flow chart of performing the power saving method for the plurality of connection ports P1 to PN by the display controller 100. The power saving method for the plurality of connection ports P1 to PN performed by the display controller 100 can include step S401 to step S409. Any reasonable technology modification falls into the scope of the present invention. Step S401 to step S409 are written below.

step S401: enable a main power saving loop process by the display controller 100;

step S402: detect if the at least one input signal is received by the input signal detection unit 11 within the first time period, if yes, go to step S401, else, go to step S403;

step S403: disable the input signal detection unit 11 or other high power consumption control units so as to decrease power consumption of the display controller 100 for 20 seconds;

step S404: set a counter value equal to the number of connection ports P1 to PN and generating a connection pointer to indicate a connection port corresponding to an input signal format;

step S405: detect if the counter value is equal to zero, if yes, go to step S403, else, go to step S406;

step S406: enable the input signal detection unit 11 or other high power consumption control units for entering an operation state of the display controller 100 capable of detecting the at least one input signal at any time;

step S407: detect if the at least one input signal is steadily received by the input signal detection unit 11 within the first time period, if yes, go to step S408, else, go to step S409;

step S408: enable all functionalities of the display controller 100.

step S409: decrease the counter value, update the connection pointer, and go to step S405.

In step S401, the display controller 100 can enable the main power saving loop process. For example, the display controller 100 can enable the input signal detection unit 11 for periodically detecting if the control unit 13 (i.e., I/O key) is triggered. The display controller 100 is prepared to detect a presence and/or stability of the at least one input signal. Further, a user can set at least one display parameter of the display controller 100 by using the control unit 13. The at least one display parameter includes the input signal format. The input signal format can include a video graphics array (VGA) format, a high definition multimedia interface (HDMI) format, or a display port (DP) format. For example, the input signal format can be set as the VGA format. In the following, the display controller 100 can scan a plurality of connection ports P1 to PN for preparing to detect if the at least one input signal is received by one of the plurality of connection ports according to the (preconfigured) input signal format. Initially, for example, the connection port P1 is scanned as a connection port for receiving a VGA format signal. A connection port P2 is scanned as a connection port for receiving an HDMI format signal. A connection port P3 is scanned as a connection port for receiving a DP format signal. The display controller 100 can scan the plurality of connection ports P1 to P3. In step S402, the input signal detection unit 11 can detect if the at least one input signal is received within the first time period. For example, the input signal detection unit 11 can detect if the at least one input signal is received by the connection port P1 within a period of two image frames. Also, the input signal detection unit 11 can detect if a frequency and a voltage of the at least one input signal of the connection port P1 corresponding to the VGA format are stable. When the at least one input signal is unstable or is not received by the input signal detection unit 11 through the connection port P1 corresponding to the VGA format within the first time period, according to step S403, the processor 12 can disable the input signal detection unit 11 or other high power consumption control units so as to decrease power consumption of the display controller 100 for the second time period with 20 seconds length. In other words, the display controller 100 enters the power saving mode for 20 seconds. When the at least one input signal is received steadily by the input signal detection unit 11 through the connection port P1 corresponding to the VGA format within the first time period, the display controller 100 can perform step S401 for continuously detecting the at least one input signal. However, the display controller 100 is not limited to performing the power saving mode for 20 seconds. For example, the display controller 100 can enter the power-off mode or the power saving mode for any time length. Any reasonable method and technology modification for saving power falls into the scope of the present invention. After the display controller 100 enters the power saving mode for 20 seconds in step S403, the processor 12 (or a counter) can set the counter value equal to the number of the plurality of connection ports P1 to PN and generate the connection pointer to indicate a connection port corresponding to the input signal format according to step S404. For example, when the connection port P1 corresponds to the VGA format, the connection port P2 corresponds to the HDMI format, the connection port P3 corresponds to the DP format, the counter value can be set equal to 3. A connection pointer "*1" can indicate pointing to the connection port P1 corresponding to the VGA format. A connection pointer "*2" can indicate pointing to the connection port P2 corresponding to the HDMI format. A connection pointer "*3" can indicate pointing to the connection port P3 corresponding to the DP format. Then, in step S405, the display controller 100 can detect if the counter value is equal to zero. If the counter value is equal to zero, it implies that a scanning loop is already performed three times. After all connection ports P1 to PN are detected, the display controller 100 can perform step S403 to disable the input signal detection unit 11 or other high power consumption control units for 20 seconds. If the counter value is non-zero (i.e., for example, when a scanning loop is performed at the first time, the counter value is equal to 3), according to step S406, the processor 12 can enable the input signal detection unit 11 or other high power consumption control units for entering the operation state of the display controller 100 capable of detecting the at least one input signal at any time. Then, in step S407, the input signal detection unit 11 can detect if the at least one input signal is steadily received by the connection port indicated by the connection pointer *1 (i.e., VGA port P1) within the first time period. When the at least one input signal is steadily received by the input signal detection unit 11 through the connection port P1 indicated by the connection pointer *1 within the first time period, all functionalities of the display controller 100 can be enabled according to step S408. When the at least one input signal is not received by the input signal detection unit 11 through the connection port P1 indicated by the connection pointer *1 within the first time period, the display controller 100 can decrease the counter value (i.e., the counter value is decreased from 3 to 2) and updating the connection pointer (i.e., the connection pointer *1 is updated to a connection pointer *2). After the connection pointer *1 is updated, the updated connection pointer *2 is used for indicating another connection port of the plurality of connection ports, such as an HDMI connection port P2. Therefore, a presence of a connection port P2 indicated by the connection pointer *2 and corresponding to the HDMI format can be detected. In other words, in step S401 to step S409, the display controller 100 can perform a port scanning loop process for a plurality of connection ports P1 to PN (i.e., step S406, step S407, step S409 form the port scanning loop process). When all ports cannot steadily receive the at least one input signal corresponding to the signal format, the display controller 100 can periodically enable and disable the input signal detection unit 11. During the port scanning loop process, when the signal detection unit 11 receives the at least one input signal through a certain connection port, the port scanning loop process is completed. Since the at least one input signal is available, the processor 12 can enable all functionalities of the display controller 100 according to step S408. Therefore, since the input signal detection unit 11 or other high power consumption control units can be periodically enabled and disabled, average power consumption of the display controller 100 can be reduced. Therefore, power utilization of the display controller 100 can be optimized.

To sum up, the present invention discloses a power saving method and a display controller capable of optimizing power utilization. The power saving method can be applied to the display controller with a single or a plurality of connection ports. For the display controller with the single connection port, the display controller can periodically enable and disable a part of circuit components for reducing average power consumption. For the display controller with the plurality of connection ports, the display controller can periodically enable and disable the part of circuit components, and can further perform a port scanning loop process for sequentially scanning different connection ports according to the counter value and the connection pointer for optimizing power utilization. Therefore, since all connection ports can be scanned, the display controller can avoid introducing unnecessary power consumption according to a presence or stability of the input signal. Further, in a standby mode, since an operation power of the display controller can be alternatively switched between a normal power level and a low power level, the average power consumption can be reduced. Therefore, the power saving method of the present invention can be applied to any display controller of a display, especially in the display designed to meet a strict power reduction standard.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power saving method for a display controller comprising:
enabling an input signal detection unit of the display controller for detecting a first presence of at least one input signal of the display controller;
setting an input signal format of the display controller;
scanning a plurality of connection ports of the display controller;
setting a counter value equal to number of the plurality of connection ports;
generating a connection pointer to indicate pointing to a connection port corresponding to the input signal format;
decreasing the counter value and updating the connection pointer when the at least one input signal is not received by the input signal detection unit through the connection port indicated by the connection pointer within a first time period;
entering the display controller to a power-off mode temporarily for decreasing an operation power of the display controller from a first power to a second power within a second time period when the at least one input signal is not received by the input signal detection unit within the first time period; and
detecting a second presence of the at least one input signal continuously by the input signal detection unit after the second time period elapses,
wherein the second power is smaller than the first power, and the second power corresponds to a power of the display controller under the power-off mode, the at least one input signal is transmitted to one of the plurality of connection ports according to the input signal format, and the input signal format comprises a video format or an audio format, and after the connection pointer is updated, an updated connection pointer is configured to indicate pointing to another connection port of the plurality of connection ports.

2. The method of claim 1, further comprising:
detecting a first stability of the at least one input signal after the input signal detection unit is enabled; and
detecting a second stability of the at least one input signal by the input signal detection unit after the second time period elapses.

3. The method of claim 2, wherein detecting the second stability of the at least one input signal by the input signal detection unit after the second time period elapses comprises:
enabling the input signal detection unit for the first time period to detect if a frequency and a voltage of the at least one input signal received by the input signal detection unit are stable after the second time period elapses.

4. The method of claim 1, further comprising:
disabling the input signal detection unit for the second time period when the at least one input signal is not received by the input signal detection unit through a connection port within the first time period.

5. The method of claim 1, further comprising:
enabling all functionalities of the display controller when the at least one input signal is received by the input signal detection unit through a connection port within the first time period.

6. The method of claim 1, further comprising:
enabling all functionalities of the display controller when the at least one input signal is received by the input signal detection unit through the connection port indicated by the connection pointer within the first time period.

7. The method of claim 1, wherein the input signal detection unit is disabled for the second time period when the counter value is equal to zero.

8. The method of claim 1,
wherein when at least one connection port of the plurality of connection ports receives the at least one input signal, the display controller is operated by using the first power, and when at least one connection port of the plurality of connection ports does not receive the at least one input signal, the display controller is operated by using the second power.

9. A display controller comprising:
a power control unit configured to provide a plurality of driving voltages;
a first switch comprising:
  a first terminal coupled to the power control unit;
  a control terminal; and
  a second terminal;
an input signal detection unit coupled to the second terminal of the first switch;
a processor coupled to the power control unit, the input signal detection unit, and the control terminal of the first switch and configured to control the power control unit, the input signal detection unit, and the first switch, and configured to indicate pointing to a connection port corresponding to the input signal format; and
a control unit coupled to the processor and the power control unit through a second switch and configured to set at least one display parameter of the display controller;
wherein the least one display parameter comprises an input signal format, the at least one input signal is transmitted to one of the plurality of connection ports according to the input signal format, and the input signal format comprises a video format or an audio format;
wherein the processor enables the input signal detection unit and turns on the first switch for driving the input signal detection unit by a driving voltage, the input signal detection unit detects a first presence of at least one input signal of the display controller, the processor turns off the first switch for entering the display controller to a power-off mode temporarily so that an operation power of the display controller is decreased from a first power to a second power within a second time period when the at least one input signal is not received by the input signal detection unit within a first time period, the second power corresponds to a power of the display controller under the power-off mode, the processor turns on the first switch again for detecting a second presence of the at least one input signal continuously by the input signal detection unit after the second time period elapses, the processor adjusts an operation mode of the display controller according to the second presence of the at least one input signal, and the second power is smaller than the first power; and
wherein a counter value of a counter of the processor is initially equal to number of connection ports, the processor decreases the counter value and updating a connection pointer when the at least one input signal is not received by the input signal detection unit through the connection port indicated by the connection pointer within the first time period, and after the connection pointer is updated, an updated connection pointer is indicated pointing to another connection port of the plurality of connection ports.

10. The display controller of claim 9, wherein the processor enables the input signal detection unit for the first time period to detect if a frequency and a voltage of the at least one input signal received by the input signal detection unit are stable after the second time period elapses.

11. The display controller of claim 10, wherein the processor enables all functionalities of the display controller when the at least one input signal is received by the input signal detection unit through a connection port within the first time period.

12. The display controller of claim 9, wherein the processor enables all functionalities of the display controller when the at least one input signal is received by the input signal detection unit through the connection port indicated by the connection pointer within the first time period.

* * * * *